Figure 1:
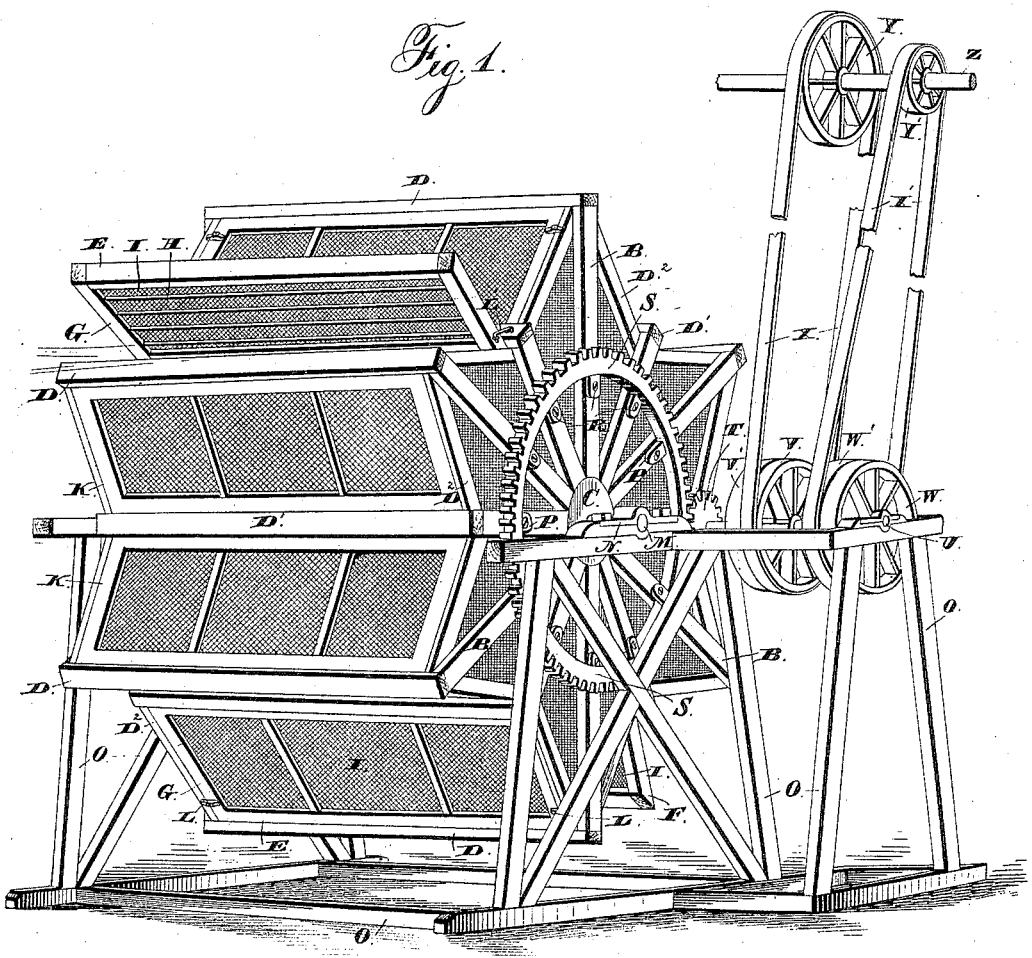

(No Model.) 2 Sheets—Sheet 1.

T. FERRY.
RAG AND SCRAP DUSTER.

No. 299,366. Patented May 27, 1884.

Witnesses:
Jas. E. Hutchinson
Henry C. Hazard

Inventor:
Thomas Ferry
by Prindle and Russell
Attorneys (No Model.) 2 Sheets—Sheet 2.
T. FERRY.
RAG AND SCRAP DUSTER.
No. 299,366. Patented May 27, 1884.
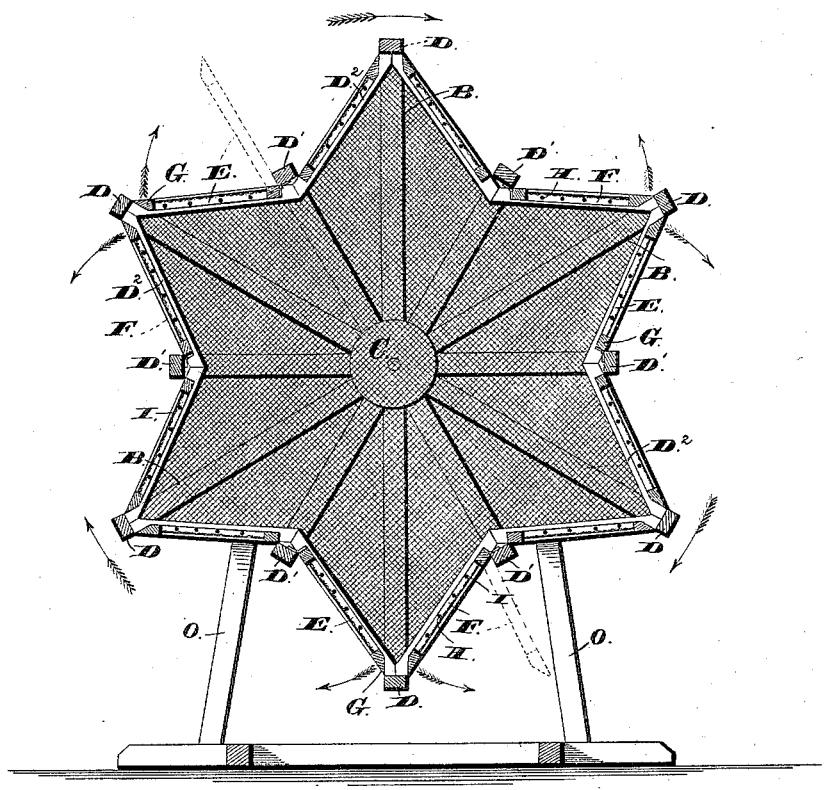
Witnesses:
Jas. E. Hutchinson.
Henry C. Hazard.
Inventor.
Thomas Ferry
by Prindle and Russell
Attorneys

UNITED STATES PATENT OFFICE.

THOMAS FERRY, OF WILMINGTON, DELAWARE.

RAG AND SCRAP DUSTER.

SPECIFICATION forming part of Letters Patent No. 299,366, dated May 27, 1884.

Application filed February 25, 1884. (No model.)

*To all whom it may concern:*

Be it known that I, THOMAS FERRY, of Wilmington, in the county of New Castle, and in the State of Delaware, have invented certain new and useful Improvements in Rag and Paper Scrap Dusters; and I do hereby declare that the following is a full, clear, and exact description thereof, reference being had to the accompanying drawings, in which—

Figure 1 shows a perspective view of my scrap-duster with one of the feed-doors open; Fig. 2, a transverse vertical section of the machine, showing one of the discharge-doors open.

Letters of like name and kind refer to like parts in each of the figures.

The object of my invention is to provide an improved machine for dusting rag and paper scrap; and to this end it consists in the construction, arrangement, and combination of parts, as hereinafter described, and more specifically pointed out in the claims.

In the drawings, A A designate the ends of a rotary cage somewhat similar in general shape to the cage described in the Patent No. 231,550, granted to me August 24, 1880. Instead of being formed of boards, as shown in the patent referred to, they are constructed of bars B B, attached at their inner ends to the disks or solid centers C C and radiating therefrom. As shown, alternate bars are shorter than the others. Attached to and connecting the outer ends of the corresponding bars are the longitudinal pieces or bars D D and D' D', the latter connecting the ends of the short bars. Attached to and connecting the end of each long bar with that of the next shorter one is the strip $D^2$. The frame-work of a cage, with inwardly and outwardly extending panels, is thus formed.

Hinged to the bars D' D' are the feed-doors E E and the discharge-doors F F, which are each formed of rectangular frames G, having the bars or rods H H extending from one end to the other thereof, and the wire-netting I stretched over and covering the outside, as shown in the drawings. If desired, each panel of the cage can be formed of a swinging door like those just described; but it is my intention to form only a portion of the series of panels so. The rest are fixed as shown at K K. Where the doors are used, they swing down between, and so as to be flush with, the frame of the panel, which is formed of longitudinal bars D and D' and the strips $D^2$ $D^2$. Upon said strips are buttons L, which serve to fasten the doors when shut. Any other desired form of fastening can of course be used instead of these. Where the panels are fixed—that is, not formed as doors—a rectangular frame constructed in every respect like that of the doors with the longitudinal bars, and with the wire-netting on the outside, can be constructed and fixed in place within the panel-frame D D' $D^2$ $D^2$. If this construction is not found desirable, the side strips, $D^2$ $D^2$, of the panel-frame can be made stronger, and the bars can be fixed in them and the netting be fastened over all. Wire-netting is also stretched between the radial bars B B.

Extending outward from each center disk, C C, is a hub or short axle, M, journaled in suitable boxes or bearings, N, on the supporting-frame O.

Attached to the bars B B on one end of the cage by means of lugs P and bolts R, passing through them and into or through the bars, is the gear-ring S, with the teeth of which meshes the pinion T on counter-shaft U, journaled in suitable bearings on the frame. On this shaft are two fast pulleys, V and W, and two loose ones, V' and W'. A belt, X, passes over either pulley V or V' and the driving-pulley Y on the driving-shaft Z. The driving-pulley Y is to be of such size with relation to fast pulley V as to drive the same fast enough to turn the cage through the intermeshing gearing described sixteen revolutions a minute. The other driving-pulley, Y', is smaller, and is preferably so proportioned with reference to pulley W as to be adapted to cause the cage, by means of band X', to revolve five times a minute.

Any of the well-known means for shifting belts can be used to shift either of the belts from its fast pulley onto the adjacent loose one, and to move the other belt from its loose pulley to its fast one on the shaft U. The cage is driven at the higher rate of speed when the scrap is being dusted and at the lower rate when the dusted scrap is being discharged, as hereinafter described. When the cage is to revolve in the direction indicated by the arrows in Fig. 1, the feed-doors are to be in or to form the panels which are inclined inward in the direction of the revolution, and the discharge-doors are to be situated in or to form some of the other panels. For each door fastening-hooks L' L' are provided for fastening said door back when it is opened.

As indicated in the drawings, it is not intended that there shall be in the same pair of panels a feed and a discharge door. Where a feed-door forms one of a pair of panels, the next discharging-door forms one of the next pair. The number of panels and doors can be increased indefinitely, as desired. As shown in Fig. 1, the feed-doors, when situated as described, are most conveniently placed for admission of the load of scrap to be dusted. When the door is closed and the cage revolved, the mass of scrap (as was the case with the carpet in the cage shown and described in my patent referred to) is carried up and dropped down on the panels which happen to be below at the time. The longitudinal rods support the mass of scrap and allow the dust to fall through and out of the cage. The wire-netting outside of the rods prevents the escape of any of the scrap, while allowing free passage for the dust. On account of the angle at which the panels in which the feed-doors are situated stand with reference to the line of fall of the mass within the cage, said mass of material will not discharge rapidly through any of such doors. The other panels, when they come to the bottom of the cage in its revolution, are substantially at right angles to the line of fall of the mass, so that the material can freely fall directly through if a door in one of them be left open. To facilitate such discharge of the dusted scrap, the cage is designed to be revolved slower than when the dusting operation is continuing.

The means for making the change of speed and the extent of such change are described above.

Having thus fully set forth the nature of my invention, what I claim is—

1. A rag and paper scrap duster consisting of the cage or drum having its periphery formed with a series of panels extending alternately inward and outward, each panel having longitudinal rods and a covering of netting, substantially as shown and described.

2. A rag and paper scrap dusting drum consisting of a cage having open ends covered with netting, and its periphery formed of alternately inwardly and outwardly extending panels provided with longitudinal rods, and a covering of netting outside of the rods, substantially as and for the purpose described.

3. A rag and paper scrap dusting drum consisting of a cage having open ends covered with netting, and a periphery formed of alternately inwardly and outwardly extending panels provided with a covering of netting, substantially as shown and described.

4. In a rag and paper scrap dusting machine, a drum or cage having its periphery formed of panels extending alternately forward and inward and forward and outward, and discharge-doors situated in or forming one or more of the forward and outwardly extending panels, substantially as and for the purpose described.

5. In a rag and paper scrap dusting machine, a revolving drum or cage having its periphery formed of alternately forward and inwardly and forward and outwardly extending panels, one or more feed-doors situated in the forward and inwardly extending panels, and one or more discharge-doors situated in the forward and outwardly extending panels, substantially as shown and described.

6. In a rag and paper scrap dusting machine, a drum or cage having its periphery formed of alternately forward and inwardly and forward and outwardly extending panels, one or more discharge-doors situated in or forming one or more of the latter panels, in combination with means for revolving the drum to dust the contained scrap, and means for revolving it at a slower rate of speed to allow the dusted scrap to discharge itself through the discharge-doors, substantially as shown and described.

In testimony that I claim the foregoing I have hereunto set my hand this 11th day of February, 1884.

THOMAS FERRY.

Witnesses:
HENRY C. HAZARD,
JAS. E. HUTCHINSON.